Nov. 20, 1934.　　J. A. MAURER, JR., ET AL　　1,981,368
APPARATUS FOR SPLICING FILMS
Filed March 29, 1932　　3 Sheets-Sheet 1
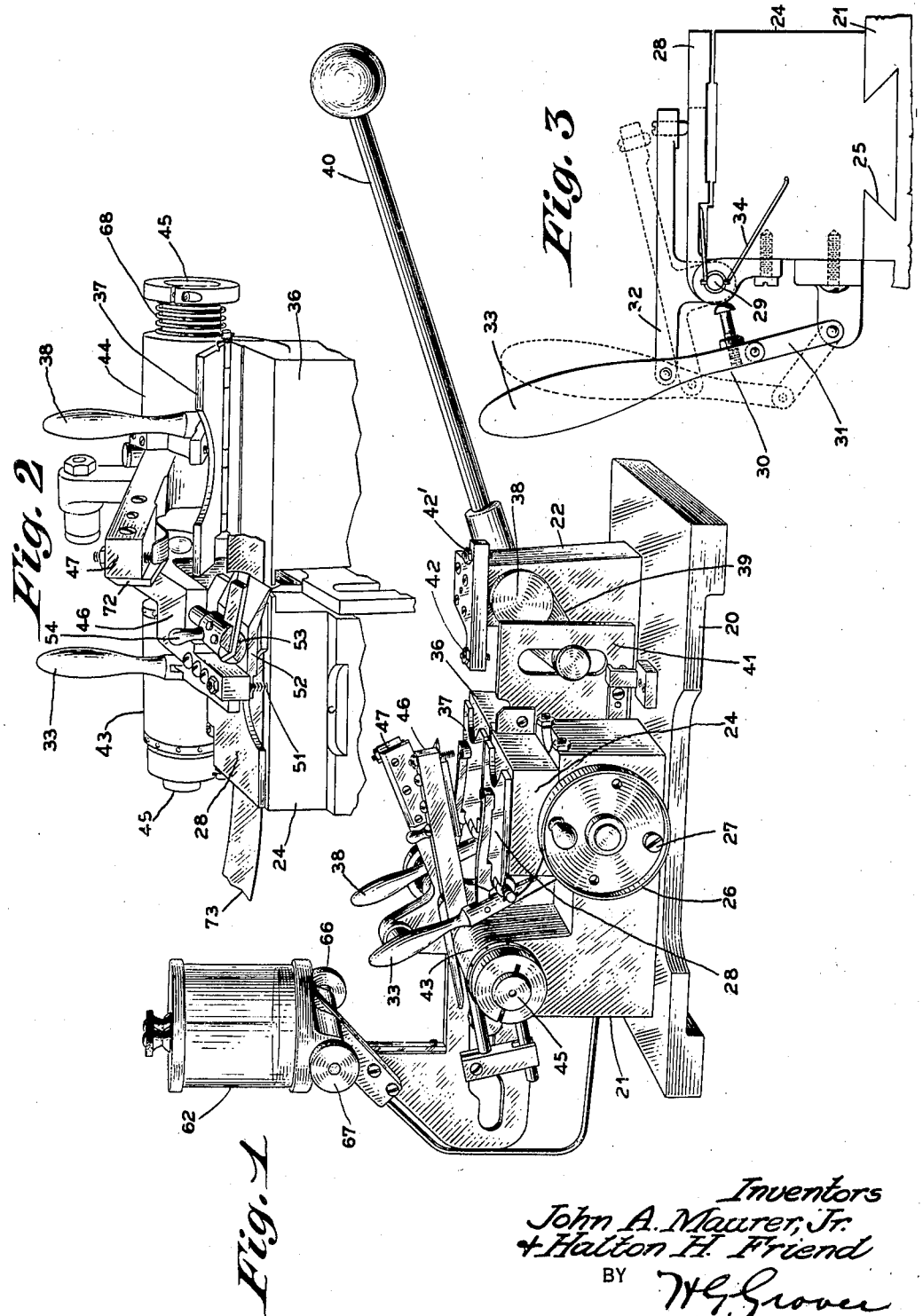
Inventors
John A. Maurer, Jr.
+ Hatton H. Friend
BY
W. G. Grover
ATTORNEY Nov. 20, 1934.  J. A. MAURER, JR., ET AL  1,981,368
APPARATUS FOR SPLICING FILMS
Filed March 29, 1932   3 Sheets-Sheet 2
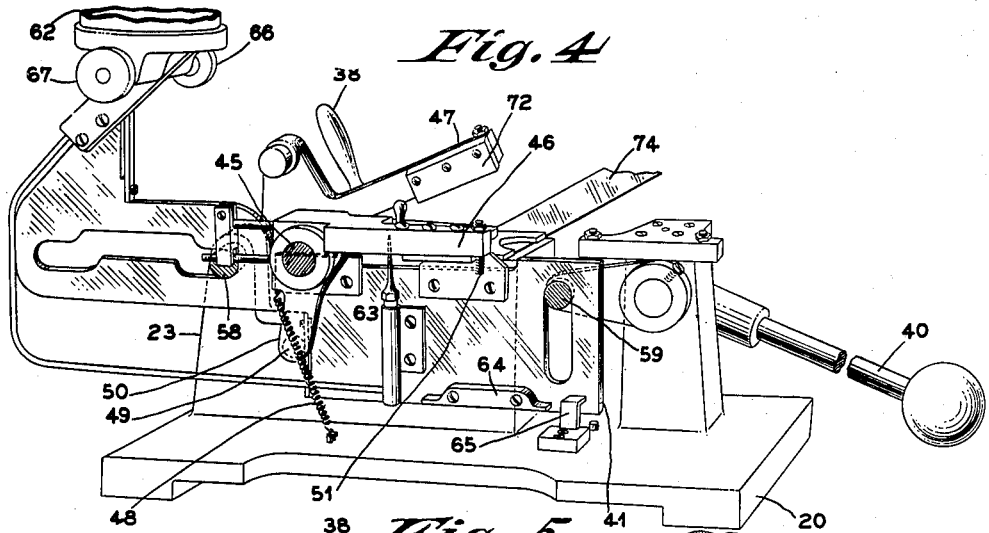
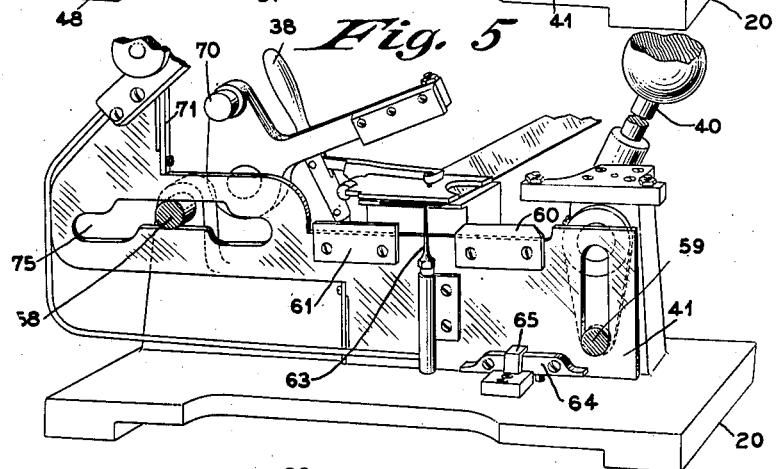
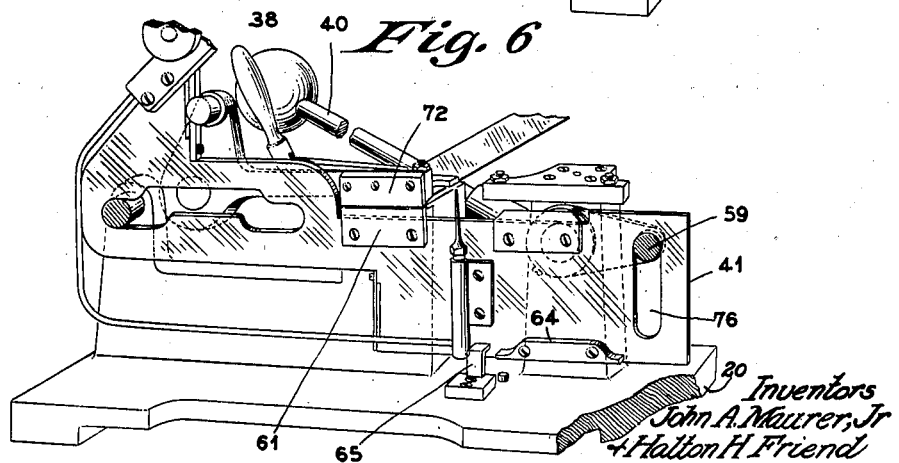
Inventors
John A. Maurer, Jr.
Halton H. Friend
BY *H. G. Groon*
ATTORNEY

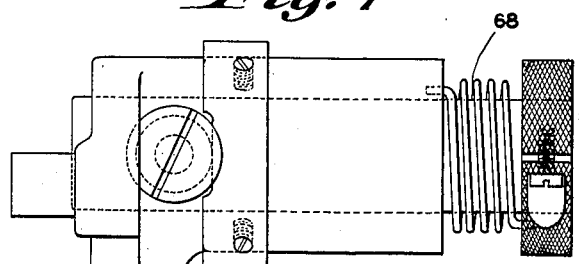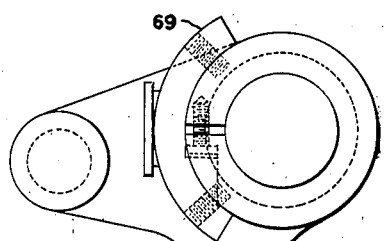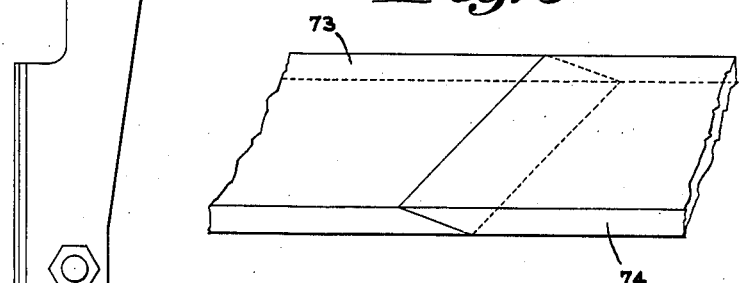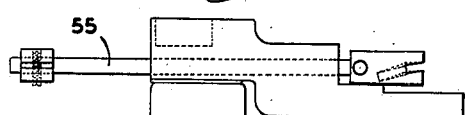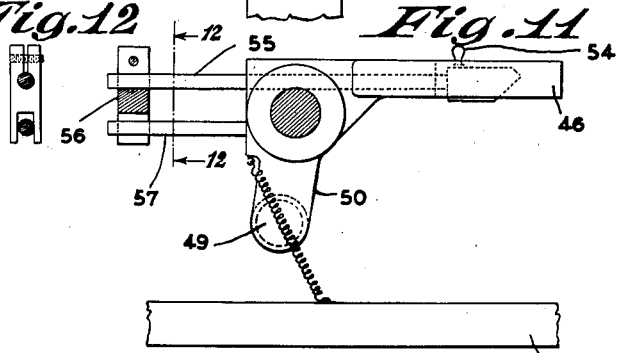

Patented Nov. 20, 1934

1,981,368

UNITED STATES PATENT OFFICE 1,981,368

APPARATUS FOR SPLICING FILMS

John A. Maurer, Jr., New York, N. Y., and Halton H. Friend, Philadelphia, Pa., assignors to Radio Corporation of America, a corporation of Delaware Application March 29, 1932, Serial No. 601,742

16 Claims. (Cl. 154—42)

Our invention relates to apparatus for splicing films such as are used for the recording and reproducing of sound, moving pictures and the like, and has for its principal object the provision of an improved film splicing apparatus and method of operation whereby the splicing operation is facilitated and a greatly improved splice is produced.

Other objects are to produce a film splice which is of the same thickness as the remainder of the film, is so accurately matched as to obviate extraneous noises or clicks, is very accurately alined at the spliced ends and may be made without appreciable loss of film length.

Various types of film splices have been proposed. Some of these splices have been made by overlapping the spliced ends. Others have been made by bringing the two film ends together and applying a transparent strip to bridge the junction. Splices of these types are not altogether satisfactory for the reason that the splice is stiff and thicker than the film, thus tending to produce irregularities in the film movement and to throw the image out of focus.

In accordance with our invention, these difficulties are avoided by the provision of a film splicing apparatus and method of operation whereby the film ends are beveled and overlapped in accurate alinement to produce a splice which has the same thickness as the film and does not interrupt the continuity of the record. The improved apparatus has been used very satisfactorily to splice the ends of a film loop bearing a helical record about two mils wide and having its adjacent turns spaced apart by a distance of two mils. It will be apparent that it may be used with similar advantages to splice other types of records and that these advantages are not dependent on the specific arrangement used to illustrate the invention but may be realized by modified arrangements within the scope of our invention.

Our invention will be better understood from the following description when considered in connection with the accompanying drawings and their scope will be pointed out in the appended claims.

Referring to the drawings,

Fig. 1 is a perspective side view of the apparatus,

Fig. 2 is a partial front view of the apparatus,

Fig. 3 illustrates the control mechanism of the film clamping plates,

Figs. 4, 5 and 6 are sectional views showing the working parts of the apparatus in their different operating positions, Figs. 7, 8 and 10 to 12 illustrate various details of the apparatus, and Fig. 9 illustrates the film splice.

The apparatus includes clamping plates which are manually operated to clamp the splice ends of the film in a position for cutting the film ends at an angle to produce a beveled splice, and a lever operated cam plate which functions in its different positions to clamp the film ends during the cutting process to supply cement to the splice and to clamp the ends together with their beveled edges overlapping after the cement has been applied. As will be seen from the following description, the operation of the apparatus is largely automatic and is capable of alining the sound tracks or other records on the two parts of the film very accurately. It has been found, as a result of repeated operation, that the transparency of the splice is substantially the same as that of the adjacent parts of the film and variation in transparency due to the splice is avoided.

The apparatus includes a base 20 provided with upwardly extending portions 21, 22 and 23. The upwardly extending portion 21 is provided with a film support member 24 arranged to be moved in a groove 25 by means of a hand wheel 26 which has a stop 27 for limiting its movement to a predetermined range. The screw action of the hand wheel is opposed by a strong spring (not shown) for the purpose of taking up all back lash and is utilized to move one end of the film splice into and out of cutting position and into splicing position. In order to accurately aline the film and prevent its movement during the cutting and splicing operations, a clamping plate 28 hinged at 29 is arranged to be clamped against the upper surface of the member 24 by a toggle 30, 31 and 32. This toggle is provided with an operating handle 33 and acts against the tension of spring 34 which is provided for biasing the film clamping plate to its open position. It will be noted that the members 24 and 28 are cut away slightly at the central portion of their opposed surfaces so that only the edges of the film are gripped tightly.

The member 23 is likewise provided with an adjusting member 36 and a clamping plate 37 which is operated through a toggle operating handle 38. Its operation is similar to that of the member 24 and will be readily understood without further explanation. The upwardly extending member 22 affords a bearing for a shaft 38 through which a crank shaft 39 is operated by a control lever 40. This lever, as explained hereafter in detail, controls the movement of a cam plate 41 through which various steps in the operation of the apparatus are effected. At its top the member 22 is provided with two adjustable stops 42 and 42' arranged to contact with the top of the cam plate 41 under certain conditions of operation.

The members 21 and 23 are provided at the rear with bearings 43 and 44 for shafts 45. Mounted upon the shafts 45 are a cutting arm 46 and a clamping arm 47. The cutting arm 46 is biased to its upper position by a spring 48 and is arranged to be moved to its closed position by engagement of the cam plate 41 against a pin 49 (Fig. 4) mounted on an arm 50 which is integral with the cutting arm 46. The cam surface with which the pin 49 contacts is provided with a strong spring whereby the cutting arm contact surface is held in close engagement with the film, an adjustable stop 51 being provided to limit the downward movement of the cutting arm. As shown more clearly in Fig. 2, the cutting arm has an extension 52 which engages the upper surface of the film during the cutting operation and with a cutter support 53 operated by a handle 54 and mounted on a slidable shaft 55 (Figs. 10, 11 and 12) which extends to the rear of the arm and is provided with guide members 56 and 57 for holding the cutting edge in contact with the surface of the member 52.

As shown more clearly in Figs. 4, 5 and 6, the cam member 41 is supported between the two shafts 58 and 59, is arranged to be moved endwise in response to movement of the lever 40 and has mounted upon it a film cutting support 60, a film splicing support 61, a cement reservoir 62 and a cement applying needle 63. At its lower right hand end is provided a cam member 64 which cooperates with a member 65 during certain stages of the operation. It will be observed that the supply of cement to the film through the cement applying needle 63 from the cement reservoir 62 is controlled by a flow control valve 66 and a release valve 67.

The film clamping arm 47 is biased to its open position by a spring 68 (Figs. 2 and 7), is provided with a stop 69 for limiting its movement and is moved into engagement with the film to compress it upon the clamping surface of the clamping plate 61 in response to engagement of a pin 70 with a surface 71 of the cam plate 41. It is provided at its outer end with a clamping plate 72.

Assuming the lever 40, the cutting arm 46 and the clamping arm 47 to be in the positions illustrated in Fig. 1, and the toggle handles 33 and 38 to be moved forwardly so as to raise the clamping plates 28 and 37, one end 73 of the film to be spliced is clamped between members 24 and 28 by movement of the toggle lever 33 to its rear position. The hand wheel is then operated to bring the splice end of the film over the cam plate 41 and the lever 40 is depressed to aline the cutting plate 60 with the film end and to force the cutting arm into contact with the upper surface of the film thereby clamping the film between the members 60 and 52. By means of the handle 54 the cutter mounted on the end of shaft 55 and held against member 52 by guides 56 and 57 is moved outwardly to cut the film at an angle of about 30 degrees as indicated in Fig. 2. After the film cutter 53 has been returned to its rear position the lever 40 is depressed to release the film end from members 52 and 60 and the splice end of the film is withdrawn from the upper surface of the cutting plate 60 by rotation of hand wheel 26. The film end 74 which is to form the other part of the splice is next placed with its edge against a shoulder at the rear of the member 36 in alinement with a similar shoulder at member 24 and is clamped in position by movement of the toggle lever 38 to its front position.

The film is clamped between the members 52 and 60 by movement of the lever 40 to its former position and the cutter 53 is operated as before to sever the splice end of the film. After returning the cutter member 53 to its rear position the lever 40 is raised to release the film from the members 52 and 60. The hand wheel 26 is operated to bring the stop 27 into engagement with its cooperative member and to bring the two film edges together so that their beveled portions overlap.

A supply of cement having been ensured by opening of the valve 67, the lever 40 is moved upwardly thus moving the cement applying needle 63 across the lower surface of the film as indicated in Figure 5 and thereafter clamping the film between the clamping plates 72 and 61 as indicated in Figure 6. It will be observed that the movement of the cam plate 41 is guided during the application of the cement to the film by the cam member 64 and its cooperating member 65 and that the cutting plate 60 and the clamping plate 61 mounted on the cam member 41 are raised into contact with the film due to cooperation of the shaft 58 with a slot 75 at the rear of the cam 41 and to operation of the shaft 59 in a slot 76 at the front end of the cam plate 41. It should be observed that the cement is allowed to dry for five to fifteen seconds before the lever 40 is moved into a position to clamp the splice between the clamping plates 61 and 72.

In the case of safety or acetate film stock, a cement of equal parts of acetone and ethyl acetate has been found satisfactory. Other cements which work well are pure acetone and acetone containing between two and three percent of diacetone alcohol. The last works best on stock which contains moisture but is slower than the others.

We have found in the use of the apparatus for splicing film bearing sound records as small as two mils in width that objectionable noise due to transparency of the film is eliminated and that sound tracks of such small dimensions are readily alined so as to be reproduced without difficulty. It will of course be apparent to those skilled in the art that the apparatus may be modified in various details without departing from the spirit or scope of our invention.

Having thus described our invention, what we claim is:

1. A splicing mechanism including means operable to maintain a pair of strips in alinement with one another, means operable to sever said strips along surfaces at an angle to their faces, and means for uniting said surfaces.

2. A splicing machine including means operable to maintain a pair of strips in alinement with one another, means operable to move the ends of said strips successively into a cutting plane at an angle with the strip faces, and means operable to sever said ends along said plane.

3. A splicing machine including means operable to maintain a pair of strips in alinement with one another, means operable to move the ends of said strips successively into a cutting plane at an angle with the strip faces, means operable to sever said ends along said plane, and means operable to clamp said ends during the cutting operation.

4. A splicing machine including means operable to maintain a pair of strips in alinement with one another, means operable to move the ends of said strips successively into a cutting plane at an angle with the strip faces, means operable to sever said ends along said plane, and means operable successively to clamp said ends during the cutting operation and to cement and clamp together the severed surfaces of said ends.

5. A splicing machine including means operable to maintain a pair of strips in alinement with one another, means operable to move the ends of said strips successively into a cutting plane at an angle with the strip faces, means operable to sever said ends along said plane, and means operable successively to cement and clamp together the severed surfaces of said ends.

6. A splicing mechanism including means operable to maintain a pair of strips in alinement with one another, means operable to move the ends of said strips successively into a cutting plane, means operable to clamp said ends successively in said plane, and a single means operable successively to sever said ends in said plane.

7. A splicing mechanism including means operable to maintain a pair of strips in alinement with one another, means operable to move the ends of said strips successively into a cutting plane, means operable to clamp said ends successively in said plane, a single means operable to sever said ends in said plane, and means operable to locate the severed surfaces of said ends in engagement with one another.

8. A splicing mechanism including means operable to maintain a pair of strips in alinement with one another, means operable to move the ends of said strips successively into a cutting plane, means operable to clamp said ends successively in said plane, a single means operable to sever said ends in said plane, and means operable successively to cement and clamp the severed surfaces together.

9. A splicing mechanism including means operable to maintain a pair of strips in alinement with one another, means operable to move the ends of said strips successively into a cutting plane, means operable to clamp said ends successively in said plane, means operable to sever said ends in said plane, and means including a cam member operable successively to different positions for clamping said ends during the cutting operation, for cementing the severed surfaces of said ends and for clamping said surfaces together.

10. The combination of means operable to maintain a pair of strips in alinement with one another, means operable to move the ends of said strips successively into a plane perpendicular to the edges of said strips and at an angle with the faces of said strips, and means operable to sever said ends in said plane.

11. The combination of means operable to maintain a pair of strips in alinement with one another, means operable to move the ends of said strips successively into a plane perpendicular to the edges of said strips and at an angle with the faces of said strips, means operable to sever said ends in said plane, and means operable successively to clamp said ends during said cutting operations and to cement and clamp the severed surfaces of said ends together.

12. The combination of means operable to maintain a pair of strips in alinement with one another, means including clamping elements and a cutting element, a cam member including a clamping element, and means operable to grip the ends of said strips between said clamping elements successively in the plane of said cutting element.

13. The combination of means operable to maintain a pair of strips in alinement with one another, means including clamping and cutting elements, a cam member including a clamping element, means operable to grip the ends of said strips between said clamping elements successively in the plane of said cutting element, and means for moving said cutting element transversely of said strips.

14. The combination of means operable to maintain a pair of strips in alinement with one another, means including clamping and cutting elements, a cam member including a clamping element, means operable to grip the ends of said strips between said clamping elements successively in the plane of said cutting element, means for maintaining said cutting element in a plane at an angle with the faces of said strips, and means for moving said cutting element transversely of said strips.

15. The combination of means operable to clamp a strip end, a movable member including clamping and cutting elements, a cam member including a clamping element, and means operable to grip the end of said strip between said clamping elements in the plane of said cutting element.

16. The combination of means operable to maintain a pair of strips in alinement with one another, a cutting arm including clamping and cutting elements, a clamping arm, means for moving said cutting element transversely of said strips to sever their ends along parallel surfaces, and movable means provided with a clamping element operable to cooperate with the clamping element of said cutting arm during the cutting operation and with means operable successively to apply cement to said severed surfaces and to clamp said surfaces against said clamping arm.

JOHN A. MAURER, Jr.
HALTON H. FRIEND.